April 8, 1924.  1,489,484
E. E. DAVIDSON
WINDOW GUIDE CHANNEL AND METHOD OF MAKING THE SAME
Filed July 5, 1923
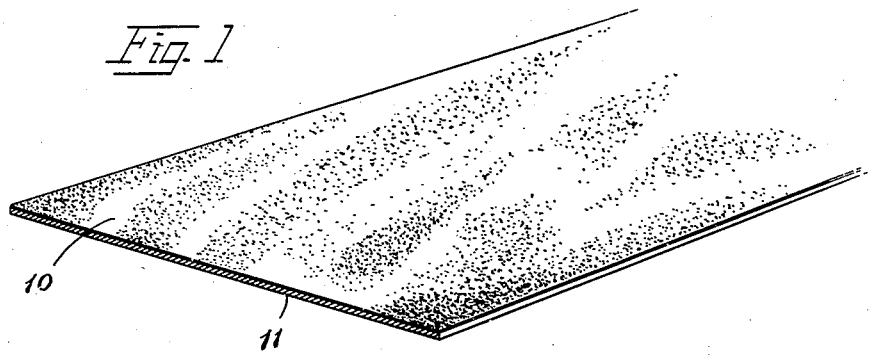
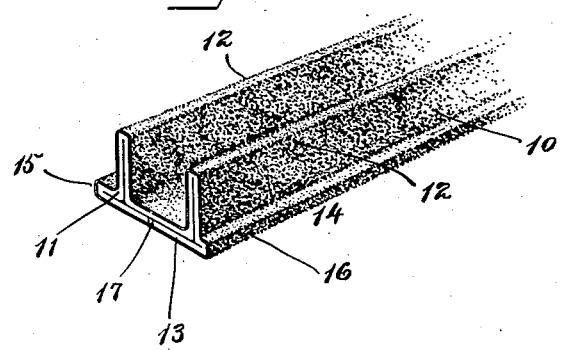
Inventor
Elias E. Davidson
By Robert M. Pierson,
Atty.

Patented Apr. 8, 1924.

1,489,484

UNITED STATES PATENT OFFICE.

ELIAS E. DAVIDSON, OF AKRON, OHIO, ASSIGNOR TO THE B. F. GOODRICH COMPANY, OF NEW YORK, N. Y., A CORPORATION OF NEW YORK.

WINDOW-GUIDE CHANNEL AND METHOD OF MAKING THE SAME.

Application filed July 5, 1923. Serial No. 649,457.

*To all whom it may concern:*

Be it known that I, ELIAS E. DAVIDSON, a citizen of the United States, residing at Akron, in the county of Summit and State of Ohio, have invented certain new and useful Window-Guide Channels and Methods of Making the Same, of which the following is a specification.

This invention relates to flexible guides or channels for sliding window-panes, and especially for windows used in automobile bodies, such guides being faced with felt, velvet or other suitable fabric to make the window-pane slide easily, and being commonly known as channels or channel strips.

It has recently been common to make such guides either entirely of felt or of a channel-shaped core of rubber extruded from a tube machine and then vulcanized and afterwards cemented and covered with the fabric, the latter form of channel having gone into very extensive use.

The object of my present invention is to provide a new construction of fabric-faced channel for the purpose mentioned which shall be free from certain of the disadvantages attendant upon the use of an extruded core, particularly in the matter of expense of production and also to some extent in the matter of quality, since it is rather difficult to use high-quality rubber compounds in a tube machine and cure them by the open-heat method which preserves the nap of the fabric and saves the cost of vulcanizing in molds.

Of the accompanying drawings, Fig. 1 is a perspective view showing a laminated rubber and fabric sheet which is used in the preferred mode of carrying out my invention.

Fig. 2 is a perspective view showing the completed channel constructed according to my invention.

In carrying out the invention in its preferred form, I take a wide sheet of fabric, such as felt or velvet, and coat it with an adhesive or plastic material such as rubber, preferably by first coating it with rubber cement in a spreading machine or frictioning it with rubber and then coating it on one side in a calender with a comparatively-thick covering of rubber, according to well-known methods. This laminated sheet, while still unvulcanized, is then cut into a plurality of strips such as shown in Fig. 1, wherein 10 is the fabric facing and 11 the rubber backing, each strip having a width sufficient to make one of the channels, and a length corresponding to that of the original sheet, and I then, by suitable means, preferably of a continuous, progressive nature, fold or double this strip upon itself, with the rubber 11 on the inside and the fabric 10 on the outside, to form the legs 12, 12 and base 13 of the channel 14, the latter in this case also having projecting flanges 15, 16 at the two edges of the base, although this is not an essential feature. The strip is preferably doubled in both the legs and the base and may have its edges brought to the middle of the bottom of the base in a butt seam or a narrow cleft as shown at 17, or to any other suitable location on the channel.

At the same time that the strip is being folded to form the channel, its plies are firmly pressed together to produce a strong adhesion between the raw rubber surfaces and, if desired, this adhesion may be facilitated by previously moistening the rubber surface with a solvent such as benzol or gasoline, or coating it with rubber cement.

When the channels 14 have thus been formed they are subjected to vulcanization, preferably in open, dry heat, and may be supported in any suitable manner while being cured, as by laying them inverted over square rods. Either before or after vulcanization the channel strips are cut into suitable lengths for use in forming window guides and are secured in place on the window frames by nailing or insertion in metallic frame strips or in any of the usual ways.

By proceeding in this way I obtain the advantage of inexpensive manufacture due to calendering the fabric in wide sheets and also obtain a superior product not only because of the better quality of rubber compound which can be used in the calendering method without unduly softening in the open-heat cure, but also because of the fact that a laminated rubber core is less likely to crack or disintegrate after vulcanization than a solid tubed core.

It will be understood that suitable modifications or additions may be made within the scope of my invention.

I claim:

1. The method of making flexible, cloth-surfaced window-guide channels which comprises coating cloth with an adhesive, and folding it into the form of a channel with the coated surface on the inside.

2. The method of making flexible, cloth-surfaced window-guide channels which comprises coating cloth with rubber, folding it into the form of a channel with the cloth face outside, and vulcanizing the channel.

3. The method of making flexible, cloth-surfaced window-guide channels which comprises coating a wide sheet of cloth with an adhesive on one side, cutting it into channel-forming strips, and folding the strips into channel form with coated faces in contact.

4. The method of making flexible, cloth-surfaced window-guide channels which comprises calendering a wide sheet of cloth with a coating of rubber on one side, cutting it into channel-forming strips, folding the strips into channel form with the cloth face outside, and vulcanizing the channels.

5. A flexible window-guide strip of channel form comprising a core consisting of sheeted plastic material folded and doubled upon itself, and an adherent cloth covering.

6. A flexible window-guide strip of channel form comprising a core of sheet-rubber folded and doubled upon itself and vulcanized, and a cloth facing vulcanized on said core.

7. A flexible window-guide strip of channel form composed of a rubber-coated, cloth-faced strip folded and doubled upon itself to form the base and channel legs and vulcanized into an integral structure.

In witness whereof I have hereunto set my hand this 25th day of June, 1923.

ELIAS E. DAVIDSON.